United States Patent
Wu et al.

(10) Patent No.: US 10,491,394 B2
(45) Date of Patent: Nov. 26, 2019

(54) METHOD AND DEVICE FOR PROCESSING VERIFICATION CODE

(71) Applicant: Beijing Xiaomi Mobile Software Co., Ltd., Haidian District, Beijing (CN)

(72) Inventors: Liangxiong Wu, Beijing (CN); Jiankai Zhao, Beijing (CN); Jianquan Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 130 days.

(21) Appl. No.: 15/712,154

(22) Filed: Sep. 22, 2017

(65) Prior Publication Data

US 2018/0091305 A1 Mar. 29, 2018

(30) Foreign Application Priority Data

Sep. 23, 2016 (CN) .......................... 2016 1 0848301

(51) Int. Cl.
| | | |
|---|---|---|
| *H04L 9/32* | (2006.01) | |
| *H04W 12/06* | (2009.01) | |
| *G06F 21/36* | (2013.01) | |
| *G06Q 20/32* | (2012.01) | |
| *H04L 29/06* | (2006.01) | |
| *H04W 4/12* | (2009.01) | |
| *H04W 12/08* | (2009.01) | |
| *G06F 21/42* | (2013.01) | |
| *H04W 12/00* | (2009.01) | |

(52) U.S. Cl.
CPC ............ *H04L 9/3228* (2013.01); *G06F 21/36* (2013.01); *H04W 12/06* (2013.01); *G06F 21/42* (2013.01); *G06Q 20/3255* (2013.01); *H04L 63/067* (2013.01); *H04L 63/0838* (2013.01); *H04L 2463/121* (2013.01); *H04W 4/12* (2013.01); *H04W 12/00502* (2019.01); *H04W 12/08* (2013.01)

(58) Field of Classification Search
CPC ....... H04L 9/3228; G06F 21/36; H04W 12/06
See application file for complete search history.

(56) References Cited

U.S. PATENT DOCUMENTS

| | | | | |
|---|---|---|---|---|
| 7,484,245 B1 * | 1/2009 | Friedman | ................ | G06F 21/52 380/283 |
| 9,119,076 B1 | 8/2015 | Gubbi | | |
| 2011/0244830 A1 * | 10/2011 | Chesnutt | ................ | H04L 51/38 455/411 |

FOREIGN PATENT DOCUMENTS

| | | |
|---|---|---|
| CN | 104935735 A | 9/2015 |
| CN | 105703908 A | 6/2016 |
| CN | 105827400 A | 8/2016 |

(Continued)

OTHER PUBLICATIONS

Extended European Search Report for European Application 17191330.4, dated Feb. 16, 2018.

(Continued)

*Primary Examiner* — Oleg Korsak
(74) *Attorney, Agent, or Firm* — Jun He Law Offices P.C.; James J. Zhu

(57) ABSTRACT

The present disclosure relates to a method and a device for processing a verification code. The method includes: acquiring the verification code in a message; determining whether the verification code has expired; and allowing an operation corresponding to the verification code if the verification code has not expired.

12 Claims, 6 Drawing Sheets

(56) References Cited

FOREIGN PATENT DOCUMENTS

EP    3188105  A1   7/2017
WO    2016061769  A1   4/2016

OTHER PUBLICATIONS

Office Action for Chinese Application No. 201610848301.9 (dated Oct. 10, 2018).

* cited by examiner

METHOD AND DEVICE FOR PROCESSING VERIFICATION CODE

CROSS REFERENCE TO RELATED APPLICATION

This application is based upon and claims a priority to Chinese Patent Application Serial No. 201610848301.9, filed with the Status Intellectual Property Office of P. R. China on Sep. 23, 2016, the entire contents of which are incorporated herein by reference.

TECHNICAL FIELD

The present disclosure relates to the field of communication technology, and more particularly, to a method and a device for processing a verification code.

BACKGROUND

With the development of mobile Internet, the usage of a terminal device, such as a smart phone, is increasing. Applications installed on the smart phone, such as a payment software, and large-scale websites, particularly shopping websites, are all provided with a SMS (Short Messaging Service) verification function. Therefore, security of shopping and correctness of verifying a user may be ensured precisely and safely, which is one of the most effective verification code systems.

In the related art, a smart terminal is able to identify the verification code using an intelligent identifying rule and then may automatically provide a copy button below the message including the verification code. The user may copy the verification code to a clipboard by clicking the copy button, thereby facilitating subsequent operations.

SUMMARY

According to embodiments of the present disclosure, there is provided a method for processing a verification code. The method includes: acquiring the verification code in a message; determining whether the verification code has expired; and allowing an operation corresponding to the verification code if the verification code has not expired.

According to embodiments of the present disclosure, there is provided a device for processing a verification code. The device includes: a processor; and a memory configured to store an instruction executable by the processor; wherein the processor is configured to: acquire the verification code in a message; determine whether the verification code has expired; and allow an operation corresponding to the verification code if the verification code has not expired.

According to embodiments of the present disclosure, there is provided a non-transitory computer readable storage medium, wherein a mobile terminal may perform a method for processing a verification code when instructions stored in the non-transitory computer readable storage medium are executed by a processor of the mobile terminal, and the method includes: acquiring the verification code in a message; determining whether the verification code has expired; and allowing an operation corresponding to the verification code if the verification code has not expired.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
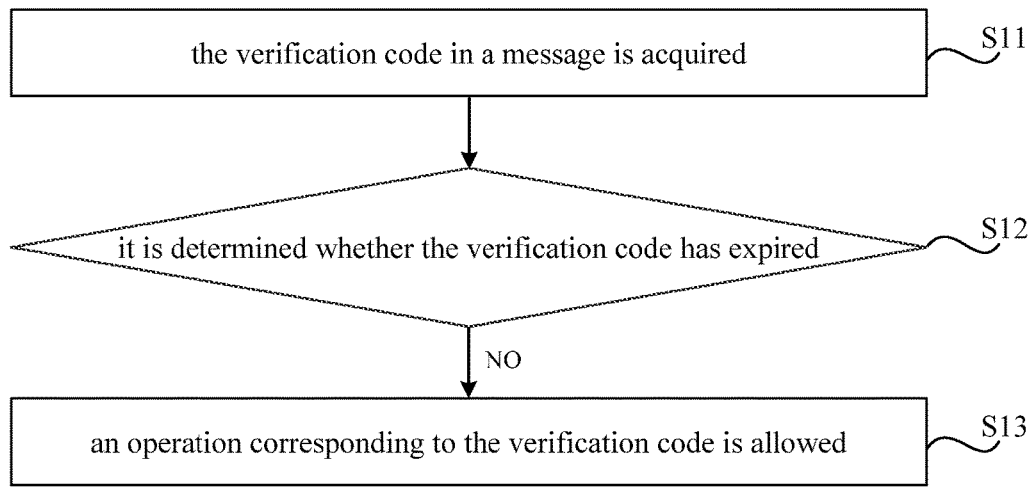
FIG. 1 is a flow chart showing a method for processing a verification code according to an exemplary embodiment.

FIG. 1 is a flow chart showing a method for processing a verification code according to an exemplary embodiment. As shown in FIG. 1, the method is applied in a terminal and the method includes followings.

In step S11, the verification code in a message is acquired.

In step S12, it is determined whether the verification code has expired.

In step S13, an operation corresponding to the verification code is allowed if the verification code has not expired.

The terminal in embodiments of the present disclosure may be a smart phone, a smart watch, a smart wristband, a tablet computer and the like. At first, in the step S11, the verification code in the message is acquired. The message may be a text message; or a chat message in a chat application, wherein the chat message may be in a form of text, speech or picture. The verification code contained in the message may be a number, a Chinese character, a letter, a character or a combination thereof. A manner of acquiring the message may be that the message is sent to the terminal by another terminal, or the message is sent to the terminal by a server via a network.

For example, an input box for inputting the verification code may be displayed on a login interface of a shopping APP, when a user logs in the shopping APP installed on a MIUI phone. The phone message including the verification code may be sent to the MIUI phone by a server corresponding to the shopping APP, when the user clicks a button on the login interface for sending the verification code.

Then, in the step S12, it is determined whether the verification code has expired (i.e., it is determined whether the verification code is within a validity period). The validity period may be carried in the message. For example, the verification code will not expire if inputted within 15 minutes, that is, the validity period is within 15 minutes from a receipt time of the verification code in the terminal. The validity period may also be a time period of a timing process of another terminal sending the message. For example, a setting of a countdown to 10 minutes is displayed on the login interface for inputting the verification code, which indicates that the verification code will expire if not inputted within 10 minutes. Then, the validity period is 10 minutes from the time of receiving the verification code by the terminal. In some embodiments, the validity period may be set by the user. For example, the user may click a setting button on a page of the message, and a button for setting a validity period is included in a setting bar, and the user may click the button for setting a validity period and input a period manually.

Figure 2A:
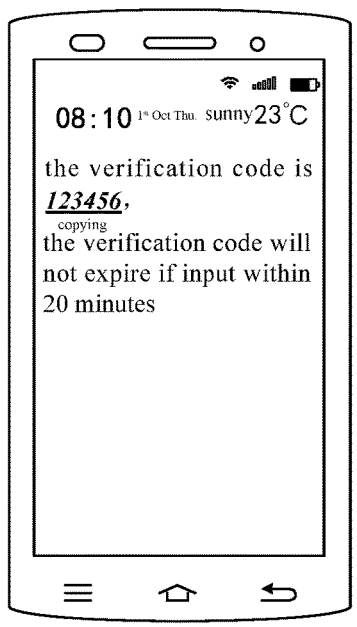
FIG. 2A is an interface of a terminal according to an exemplary embodiment.
Figure 2B:
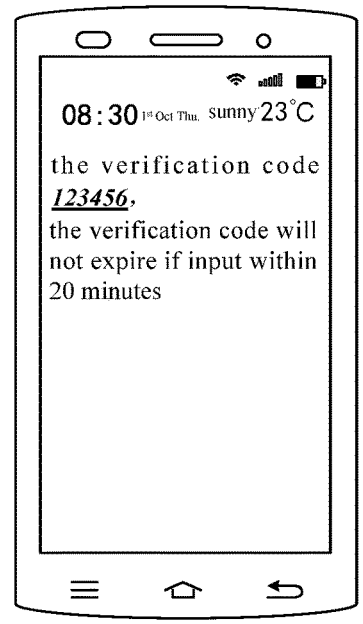
FIG. 2B is another interface of a terminal according to an exemplary embodiment.

For example, the input box for inputting the verification code may be displayed on the login interface of the shopping APP when the user logs in the shopping APP installed on the MIUI phone. As shown in FIG. 2B, if the user clicks the button on the login interface for sending the verification code, the phone message including the verification code may be sent to the MIUI phone by the server corresponding to the shopping APP, in which the verification code is 123456, and the verification code will not expire if inputted within 20 minutes. The validity period for logging in the login interface of the shopping APP is 20 minutes, that is, the verification code will not expire within 20 minutes from the time of receiving the verification code by the MIUI phone.

If it is determined that the verification code has not expired in the step S12, the step S13 is performed, that is, allowing the operation corresponding to the verification code. And if it is determined that the verification code has expired, no operation corresponding to the verification code may be performed. In one implementation, when the verification code has expired, an expiration flag of the verification code is displayed. The operation corresponding to the verification code may be at least one of a copying operation, a cutting operation and a moving operation corresponding to the verification code. For example, after the copying operation corresponding to the verification code is allowed, a copying button is displayed below the verification code, and then the verification code may be copied automatically to a chipboard or the verification code may be copied to the clipboard after the user clicks the copying button. In some embodiments, after the moving operation corresponding to the verification code is allowed, the verification code may be copied automatically to the input box.

For example, the input box for inputting the verification code may be displayed on the login interface of the shopping APP, if the user logs in the shopping APP installed on the MIUI phone. As shown in FIG. 2A, if the user clicks the button on the login interface for sending the verification code, the phone message including the verification code is sent to the MIUI phone by the server corresponding to the shopping APP, in which the verification code is 123456, and the verification code will not expired if inputted within 20 minutes. As shown in FIG. 2A, the copying operation corresponding to the verification code is allowed, if it is determined that the verification code has not expired (e.g. it is determined that the verification code is within the validity period, for example, 20 minutes) by the MIUI phone. The copying button is displayed below the verification code. The verification code 123456 is copied to the clipboard after the user clicks the copying button. The verification code 123456 is pasted to the input box if the user clicks a pasting button in the input box on the login interface of the shopping APP. At last, the user may click "login in".

With embodiments of the present disclosure, by determining that the verification code has not expired to allow the operation corresponding to the verification code, verifying the validity of the verification code is added, and intelligent operations on information of the verification code is optimized. Furthermore, only when the verification code has not expired, the operation corresponding to the information of the verification code is performed, thereby saving screen display space and facilitating a display and operation of important information to help the user acquire and operate useful information rapidly. In addition, user experience is improved.

Figure 3:
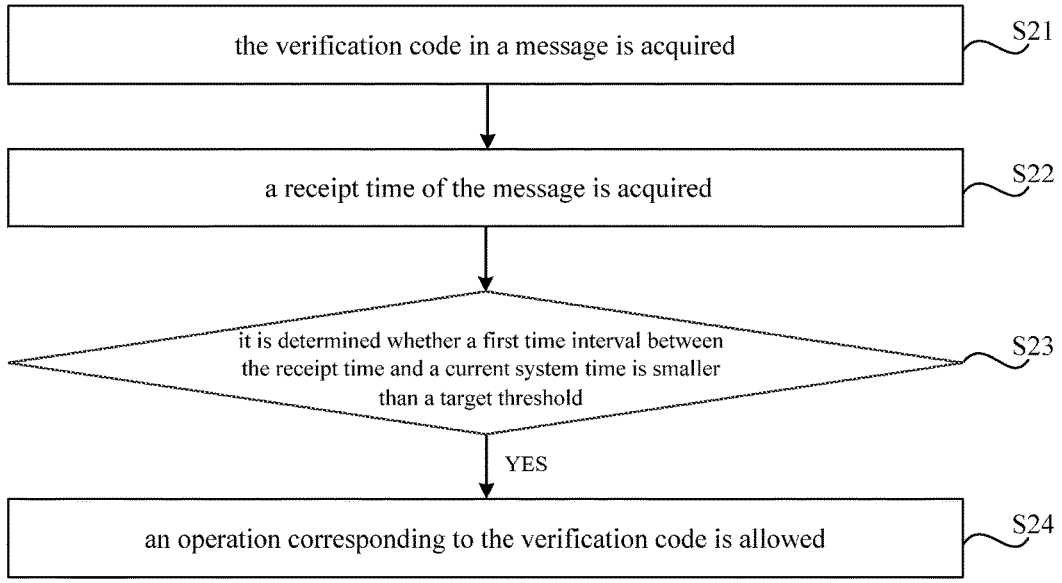
FIG. 3 is another flow chart showing a method for processing a verification code according to an exemplary embodiment.

FIG. 3 is another flow chart showing a method for processing a verification code according to an exemplary embodiment. As shown in FIG. 3, the method is applied in a terminal, and the method includes followings.

In step S21, the verification code in a message is acquired.

In step S22, a receipt time of the message is acquired.

In step S23, it is determined whether a first time interval between the receipt time and a current system time is smaller than a target threshold; wherein it is determined that the verification code has not expired if the first time interval is smaller than the target threshold.

At step S24, an operation corresponding to the verification code is allowed if the verification code has not expired.

At first, in the step S21, a manner of acquiring the message may be that the message is sent to the terminal by another terminal, or the message is sent to the terminal by a server via a network. After the verification code is acquired, the step S22 is performed, that is acquiring the receipt time of the message. The receipt time is the time of receiving the message by a user terminal. For example, if the message is a text message, the receipt time is the time of receiving the message including the verification code by a phone. If the message is a chat message in a chat application, the receipt time is the time of receiving the chat message from another user by the chat application.

Then, after the verification code and the receipt time are acquired, the step S23 is performed, that is, determining whether the first time interval between the receipt time and the current system time is smaller than the target threshold and determining that the verification code has not expired if the first time interval is smaller than the target threshold. The target threshold may be included in the message. For example, if the verification code will expired when inputted after 15 minutes, the target threshold is 15 minutes. The target threshold may be set by the user. For example, the user may click a setting button on a page of the message, and a button for setting the target threshold is in a setting bar, and the user may click the button for setting the target threshold and input a period manually. If it is determined that the first time interval is smaller than the target threshold, the verification code has not expired, and the step S24 is performed, that is, allowing the operation corresponding to the verification code. If it is determined that the verification code has expired, no operation corresponding to the verification code may be performed.

For example, an input box for inputting the verification code is displayed on a login interface of a shopping APP, if a user logs in the shopping APP installed on a MIUI phone. As shown in FIG. 2A, if the user clicks a button on the login interface for sending the verification code, the phone message including the verification code is sent to the MIUI phone by a server corresponding to the shopping APP, in which the verification code is 123456, and the verification code will not expire if inputted within 20 minutes. If the receipt time of receiving the message by the MIUI phone is 8:00 and the current system time provided by the MIUI phone is 8:10 when the user desires to operate the verification code, the first time interval is 10 minutes while the target threshold is 20 minutes. Since the first time interval is smaller than the target threshold, it is determined that the verification code has not expired. A copying operation corresponding to the verification code is allowed by the MIUI phone. A copying button is displayed below the verification code, and then the verification code 123456 is copied to a clipboard after the user clicks the copying button. The verification code 123456 is copied into the input box if the user clicks a pasting button in the input box on the login interface of the shopping APP. Lastly, the user may click "login in".

Figure 4:
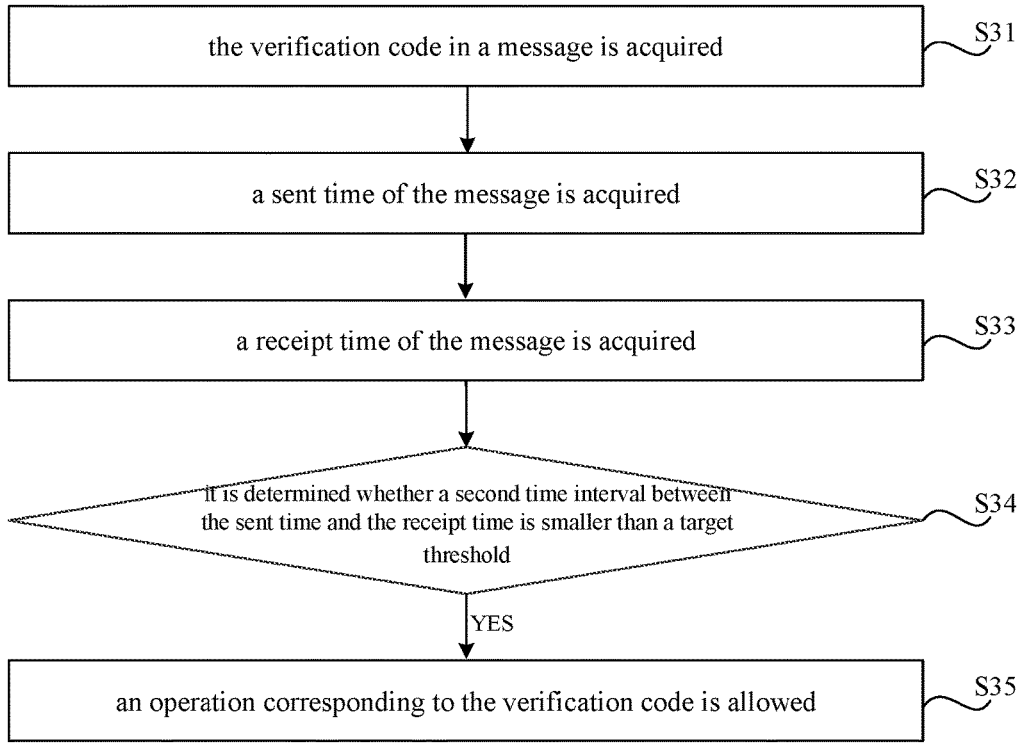
FIG. 4 is another flow chart showing a method for processing a verification code according to an exemplary embodiment.

FIG. 4 is another flow chart showing a method for processing a verification code according to an exemplary embodiment. As shown in FIG. 4, the method is applied in a terminal and the method includes followings.

In step S31, the verification code in a message is acquired.

In step S32, a sent time of the message is acquired.

In step S33, a receipt time of the message is acquired.

In step S34, it is determined whether a second time interval between the sent time and the receipt time is smaller than a target threshold; and it is determined that the verification code has not expired if the second time interval is smaller than the target threshold.

In step S35, an operation corresponding to the verification code is allowed even if the verification code has not expired.

In embodiments of the present disclosure, a manner of receiving the message may be that the message is sent to the terminal by another terminal, or the message is sent to the terminal by a server via a network. If the message is sent by another terminal or by the server, the time information of sending the message is generally carried in property of the message. Therefore, the sent time may be acquired by searching the property of the message. The receipt time is the time of receiving the message by a user terminal. For example, if the message is a text message, the receipt time is the time of receiving the message including the verification code by a phone; if the message is a chat message in a chat application, the receipt time is the time of receiving the chat message from another user by the chat application.

After the verification code, the sent time and the receipt time are acquired, the step S34 is performed, that is, determining whether the second time interval between the sent time and the receipt time is smaller than the target threshold and determining that the verification code has not expired if the second time interval is smaller than the target threshold. The target threshold may be contained in the message. For example, if the verification code will not expire when inputted within 15 minutes, the target threshold is 15 minutes. The target threshold may also be set by the user. For example, the user may click a setting button on a page of the message, and a button for setting the target threshold is presented in a setting bar, and the user may click the button for setting the target threshold and input a period manually. If it is determined that the second time interval is smaller than the target threshold, the verification code has not expired, the step S35 is performed, that is, allowing the operation corresponding to the verification code. If it is determined that the target threshold has expired, no operation corresponding to the verification code may be performed.

Figure 5:
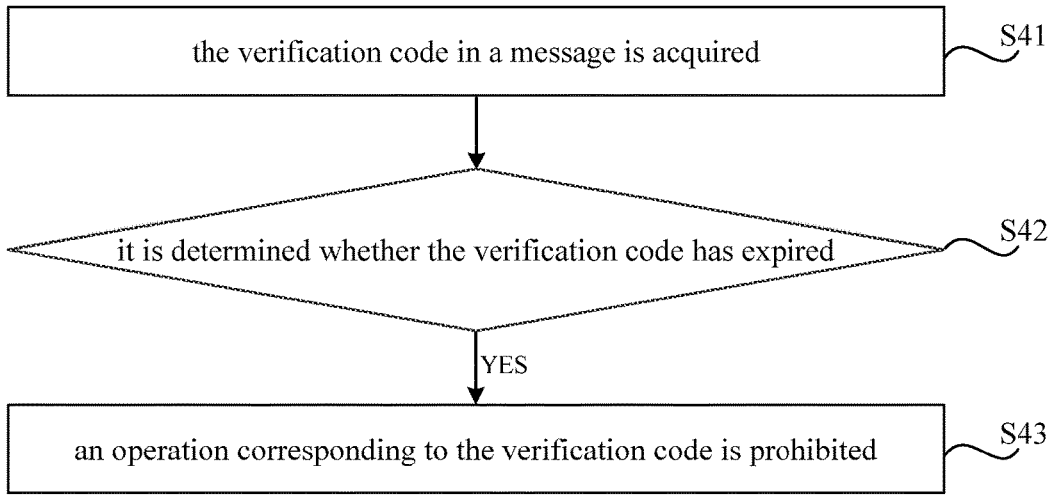
FIG. 5 is a flow chart showing a method for prohibiting an operation corresponding to a verification code according to an exemplary embodiment.

FIG. 5 is a flow chart showing a method for prohibiting an operation corresponding to a verification code according to an exemplary embodiment. As shown in FIG. 5, the method is applied in a terminal and the method includes followings.

In step S41, the verification code in a message is acquired.

In step S42, it is determined whether the verification code has expired.

In step S43, an operation corresponding to the verification code is prohibited, if the verification code has expired.

In embodiments of the present disclosure, the operation corresponding to the verification code may be a copying operation, a cutting operation or a moving operation corresponding to the verification code. For example, a copying button below the verification code disappears and the verification code may not be copied automatically after the copying operation corresponding to the verification code is prohibited. In some embodiments, the verification code may not be copied to an input box for inputting the verification code automatically after the moving operation corresponding to the verification code is prohibited.

For example, an input box for inputting the verification code may be displayed on a login interface of a shopping APP, when a user logs in the shopping APP installed on a MIDI phone. As shown in FIG. 2B, the phone message including the verification code is sent to the MUM phone by a server corresponding to the shopping APP if the user clicks a button on the login interface for sending the verification code, in which the verification code is 123456, and the verification code will not expired if inputted within 20 minutes. As shown in FIG. 2B, if a time of receiving the phone message by the MIUI phone is 8:00, and a current system time provided by the MIUI phone when the user desires to operate the verification code is 8:30, thus a time interval between the receipt time and the current system time exceeds a validity period. The copying operation corresponding to the verification code is prohibited if it is determined that the verification code has expired (i.e., it is determined that the verification code exceeds the validity period, for example, 20 minutes). A copying button below the verification code disappears and the verification code 123456 may not be copied to a clipboard by the user.

Figure 6:
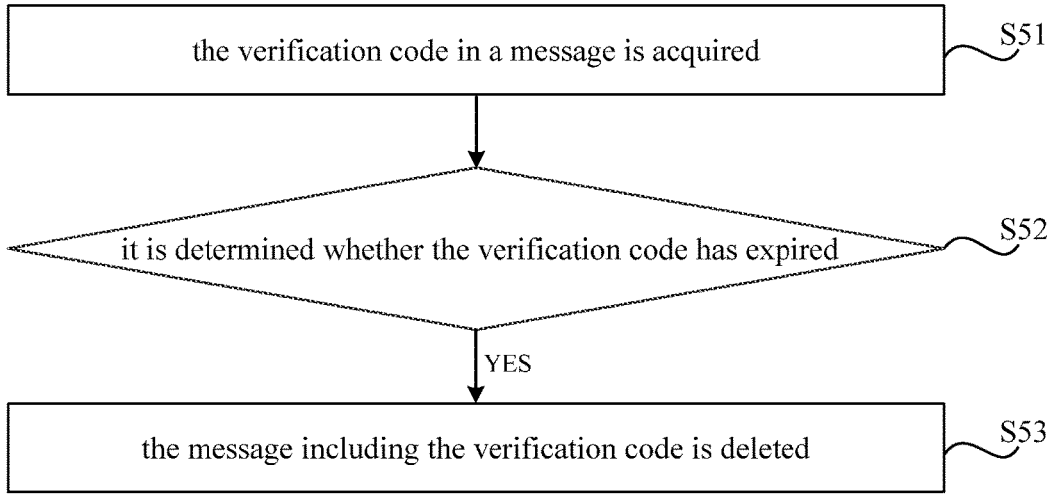
FIG. 6 is a flow chart showing a method for deleting a verification code according to an exemplary embodiment.

FIG. 6 is a flow chart showing a method for deleting a verification code according to an exemplary embodiment. As shown in FIG. 6, the method is applied into a terminal and the method includes followings.

In step S51, the verification code in a message is acquired.

In step S52, it is determined whether the verification code is has expired.

In step S53, the message including the verification code is deleted if the verification code has expired.

For example, an input box for inputting the verification code is displayed on a login interface of a shopping APP, if the user logs in the shopping APP installed on a MIUI phone. The phone message including the verification code is sent to the MIUI phone by a server corresponding to the shopping APP if the user clicks a button on the login interface for sending the verification code, in which the verification code is 123456, and the verification code will not expire if inputted within 20 minutes. If a period of storing the verification code into the MIUI phone exceeds 20 minutes, the verification code has expired. Then the phone message including the verification code is deleted by the MIUI phone.

By deleting the message including the expired verification code, a display and operation of important information is facilitated and a storage space of the terminal may be released.

Figure 7:
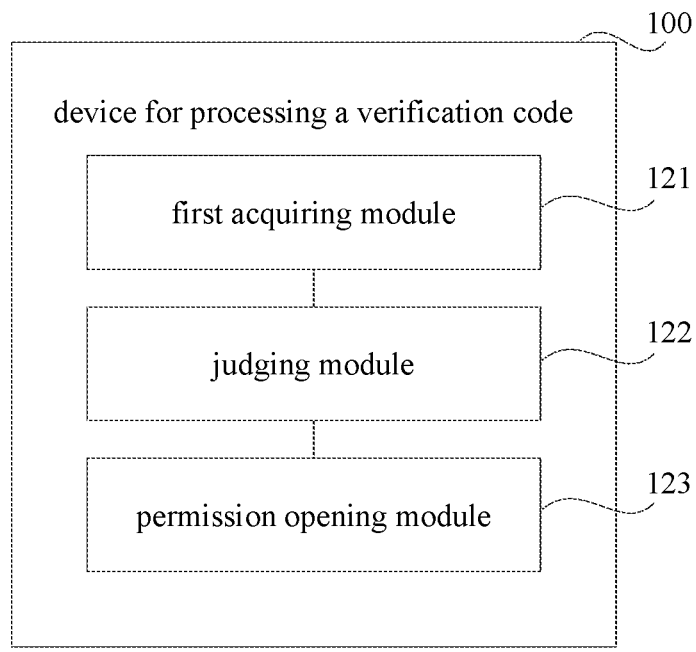
FIG. 7 is a block diagram of a device for processing a verification code according to an exemplary embodiment.

FIG. 7 is a block diagram of a device for processing a verification code according to an exemplary embodiment. As shown in FIG. 7, the device includes a first acquiring module 121, a judging module 122 and a permission opening module 123.

The first acquiring module 121 is configured to acquire the verification code in a message.

The judging module 122 is configured to determine whether the verification code is valid.

The permission opening module 123 is configured to allow an operation corresponding to the verification code if it is determined that the verification code has not expired by the judging module 122.

Figure 8:
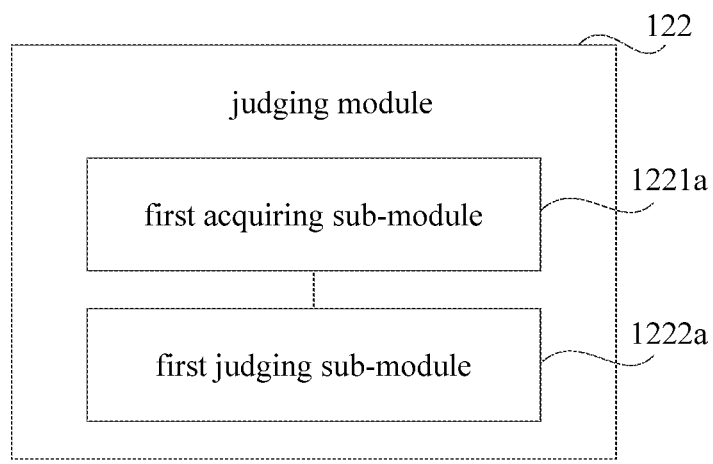
FIG. 8 is a block diagram of a judgement module included in a device for processing a verification code according to an exemplary embodiment.

In some embodiments, as shown in FIG. 8, the judging module 122 includes a first acquiring sub-module 1221a and a first judging sub-module 1222a The first acquiring sub-module 1221a is configured to acquire a time of receiving the message.

The first judging sub-module 1222a is configured to judge whether a first time interval between the receipt time of the message and a current system time is smaller than a target threshold and to determine that the verification code has expired if the first time interval is smaller than the target threshold.

Figure 9:
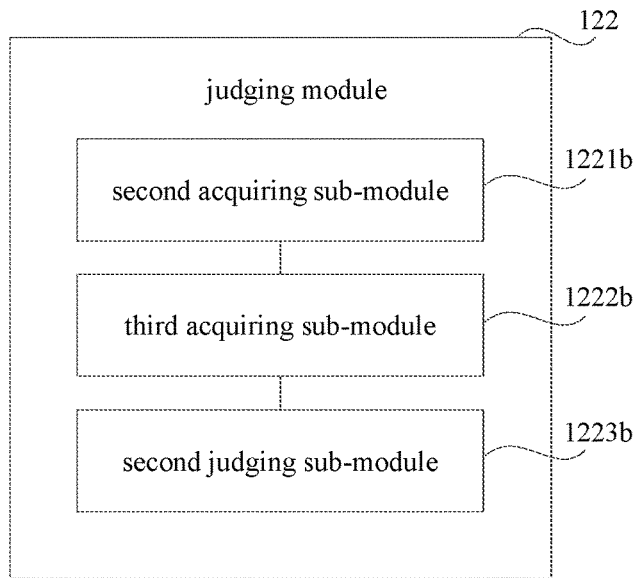
FIG. 9 is another block diagram of a judgement module included in a device for processing a verification code according to an exemplary embodiment.

In some embodiments, as shown in FIG. 9, the judging module 122 includes a second acquiring sub-module 1221b, a third acquiring sub-module 1222b and a second judging sub-module 1223b.

The second acquiring sub-module 1221b is configured to acquire a sent time of the message.

The third acquiring sub-module 1222b is configured to acquire a receipt time of the message.

The second judging sub-module 1223b is configured to determine whether a second time interval between the sent time of the message and the receipt time of the message is smaller than the target threshold, and to determine that the verification code has expired if the second time interval is smaller than the target threshold.

In some embodiments, the permission opening module 123 is configured to allow a copying, cutting or moving operation corresponding to the verification code.

Figure 10:
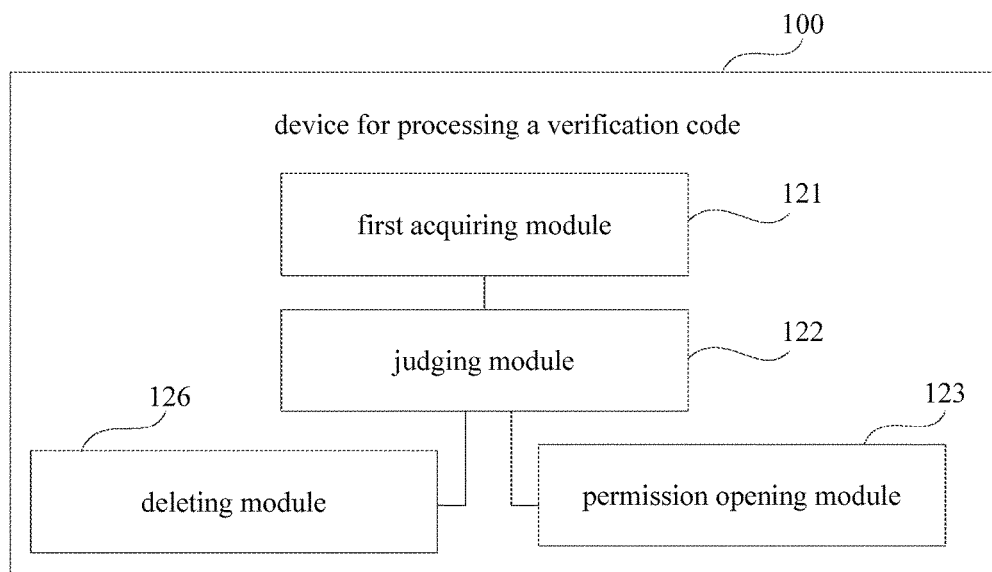
FIG. 10 is another block diagram of a device for processing a verification code according to an exemplary embodiment.

In some embodiments, as shown in FIG. 10, the device 100 further includes a deleting module 126 in addition to the first acquiring module 121, the judging module 122 and the permission opening module 123.

The deleting module 126 is configured to delete the message including the verification code if it is determined that the verification code has expired by the judging module 122.

Regarding to the device in embodiments of the present disclosure, a specific manner of operating by each module has been described in detail in embodiments related to the method, which is not elaborated herein.

Figure 11:
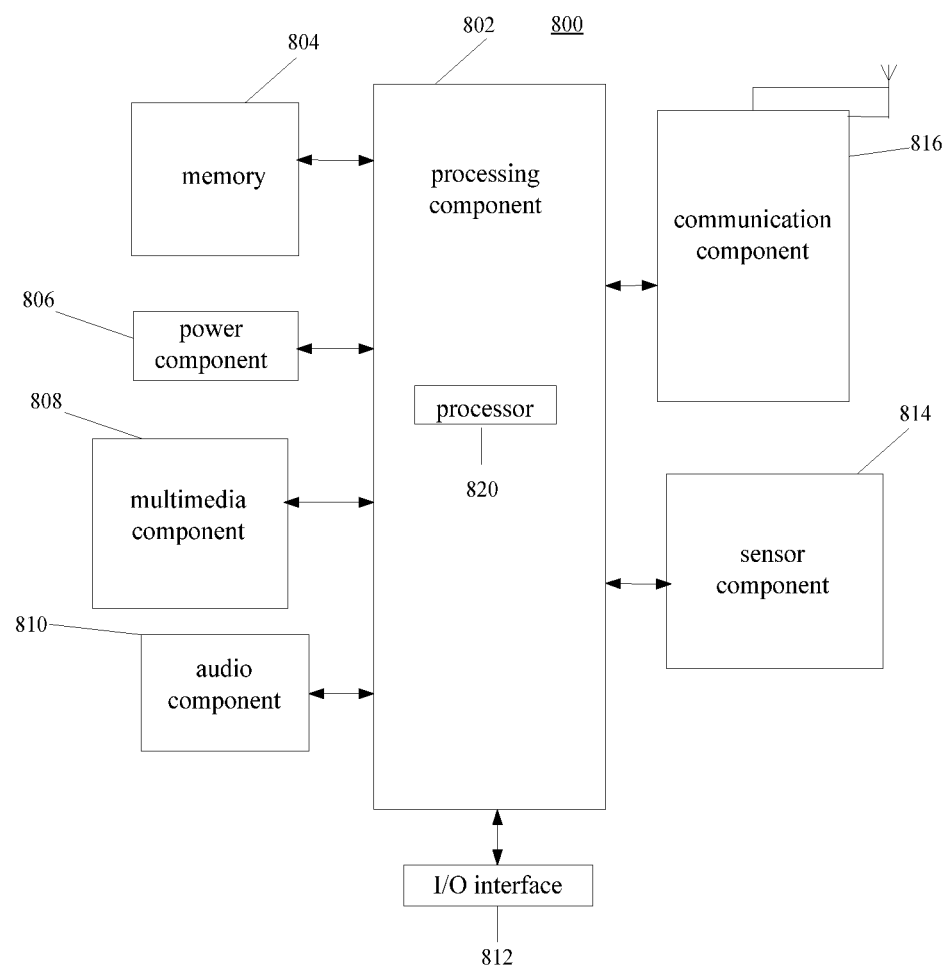
FIG. 11 is a block diagram of a device for processing a verification code according to an exemplary embodiment.

FIG. 11 is a block diagram of a device 800 for processing a verification code according to an exemplary embodiment.

For example, the device 800 may be a mobile phone, a computer, a digital broadcasting terminal, a messaging device, a game console, a tablet device, a medical device, fitness equipment, a Personal Digital Assistant PDA, and the like.

Referring to FIG. 11, the device 800 may include the following one or more components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a press panel (TP). If the screen includes the press panel, the screen may be implemented as a touch screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 808 includes a front camera and/or a rear camera. The front camera and/or the rear camera may receive external multimedia data while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface for the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an on/off status of the device 800 and relative positioning of components (e.g. the display and the keypad of the device 800). The sensor component 814 may also detect a change in position of the device 800 or of a component in the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the device 800 and other devices. The device 800 can access a wireless network based on a communication standard, such as WIFI, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 804 including instructions. The above instructions are executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that, the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method for processing a verification code, comprising:
acquiring the verification code in a message;
determining whether the verification code has expired; and
granting a permission to a user to perform a copying, cutting or moving operation to the verification code if the verification code has not expired.

2. The method according to claim 1, wherein determining whether the verification code has expired comprises:
acquiring a receipt time of the message; and
determining whether a first time interval between the receipt time and a current system time is smaller than a target threshold;
wherein it is determined that the verification code has not expired if the first time interval is smaller than the target threshold.

3. The method according to claim 1, wherein determining whether the verification code has expired comprises:
acquiring a sent time of the message;
acquiring a receipt time of the message; and
determining whether a second time interval between the sent time and the receipt time is smaller than a target threshold;
wherein it is determined that the verification code has not expired if the second time interval is smaller than the target threshold.

4. The method according to claim 1, further comprising:
deleting the message comprising the verification code if the verification code has expired.

5. A device for processing a verification code, comprising:
a processor; and
a memory configured to store an instruction executable by the processor;
wherein the processor is configured to:
acquire the verification code in a message;
determine whether the verification code has expired; and
grant a permission to a user to perform a copying, cutting or moving operation to the verification code if the verification code has not expired.

6. The device according to claim 5, wherein the processor is configured to judge whether the verification code is valid by acts of:
acquiring a receipt time of the message; and
determining whether a first time interval between the receipt time and a current system time is smaller than a target threshold;
wherein it is determined that the verification code has not expired if the first time interval is smaller than the target threshold.

7. The device according to claim 5, wherein the processor is configured to determine whether the verification code has expired by acts of:
acquiring a sent time of the message;
acquiring a receipt time of the message; and determining whether a second time interval between the sent time and the receipt time is smaller than a target threshold;

wherein it is determined that the verification code has not expired if the second time interval is smaller than the target threshold.

8. The device according to claim 5, wherein the processor is further configured to:

delete the message comprising the verification code if the verification code has expired.

9. A non-transitory computer-readable storage medium having stored therein instructions that, when executed by a processor of a mobile terminal, causes the mobile terminal to perform a method for processing a verification code, the method comprising:

acquiring the verification code in a message;

determining whether the verification code has expired; and granting a permission to a user to perform a copying, cutting or moving operation to the verification code if the verification code has not expired.

10. The non-transitory computer-readable storage medium according to claim 9, wherein determining whether the verification code is valid comprises:

acquiring a receipt time of the message; and determining whether a first time interval between the receipt time and a current system time is smaller than a target threshold;

wherein it is determined that the verification code has not expired if the first time interval is smaller than the target threshold.

11. The non-transitory computer-readable storage medium according to claim 9, wherein determining whether the verification code has expired comprises:

acquiring a sent time of the message;

acquiring a receipt time of the message; and determining whether a second time interval between the sent time and the receipt time is smaller than a target threshold;

wherein it is determined that the verification code has not expired if the second time interval is smaller than the target threshold.

12. The non-transitory computer-readable storage medium according to claim 9, wherein the method further comprises:

deleting the message comprising the verification code if the verification code has expired.

* * * * *